United States Patent

[11] 3,624,833

| [72] | Inventor | Armand G. Ricard |
| | | Viroflay, Yvelines, France |
| [21] | Appl. No. | 814,596 |
| [22] | Filed | Apr. 9, 1969 |
| [45] | Patented | Nov. 30, 1971 |
| [73] | Assignee | Breguet-Aviation |
| | | Yvelines, France |
| [32] | Priority | Apr. 19, 1968 |
| [33] | | France |
| [31] | | 148733 |

[54] DEVICE FOR ATTACHING EXTERNAL LOADS TO THE WINGS OF AIRCRAFT OF VARIABLE GEOMETRY
6 Claims, 14 Drawing Figs.

[52] U.S. Cl. .................................................. 244/118, 244/46, 244/137
[51] Int. Cl. .................................................. B64c 3/40
[50] Field of Search .................................................. 244/118, 137, 46

[56] References Cited
UNITED STATES PATENTS

| 2,915,261 | 12/1959 | Wallis | 244/46 |
| 2,969,938 | 1/1961 | Wallis | 244/46 |
| 3,268,188 | 8/1966 | La Roe et al. | 244/137 |
| 3,279,721 | 10/1966 | Dethman | 244/46 |

*Primary Examiner*—Milton Buchler
*Assistant Examiner*—Steven W. Weinrieb
*Attorneys*—Abraham Engel, Howard J. Churchill, Robert S. Dunham, P. E. Henninger, Lester W. Clark, Gerald W. Griffin and Thomas F. Moran ABSTRACT: An attachment for bombs and other loads under the wings of variable geometry aircraft comprises a load support articulated to the wing whereby the loads are enabled to pivot or rotate as the variable sweep wing pivots so that the loads are always maintained parallel to the direction of flight of the aircraft.

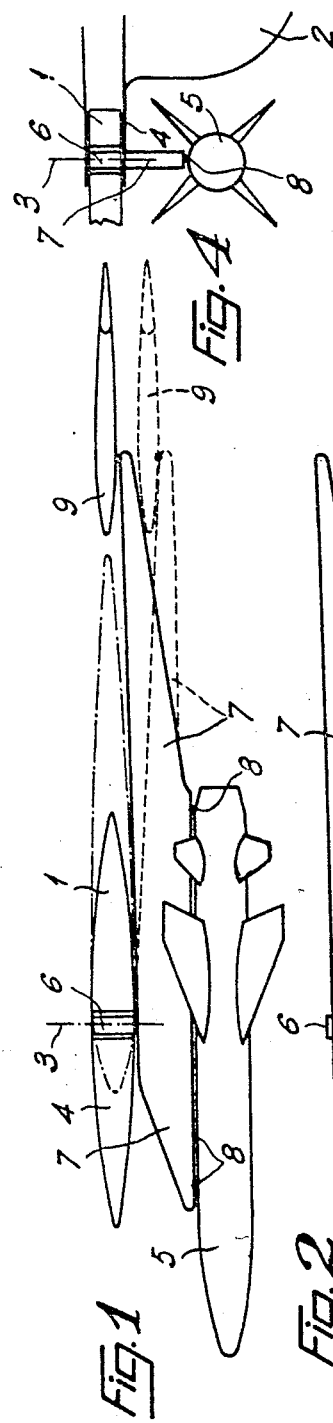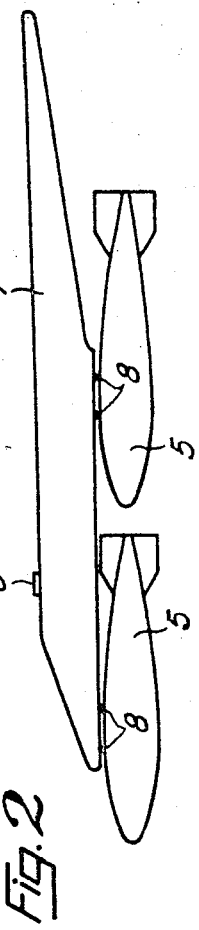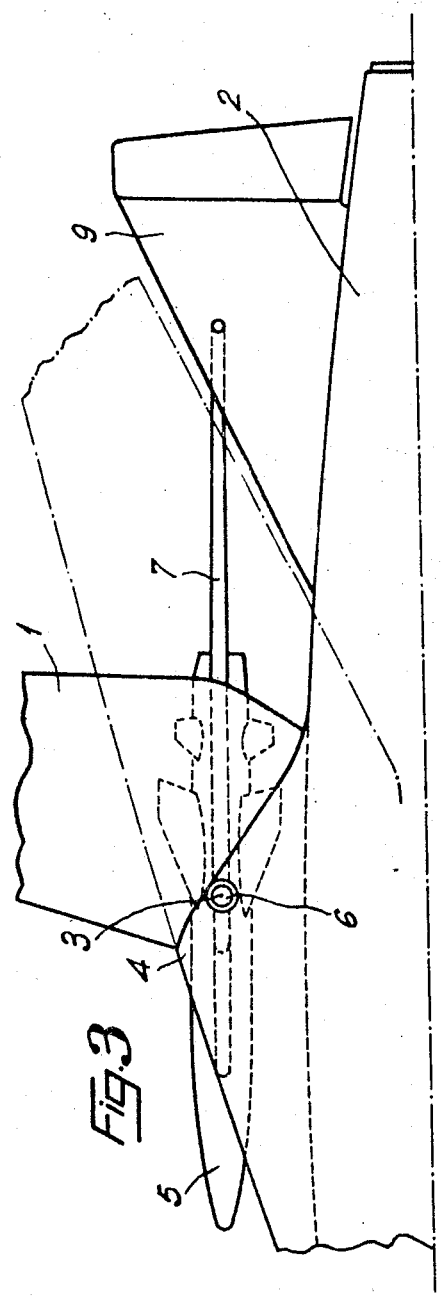

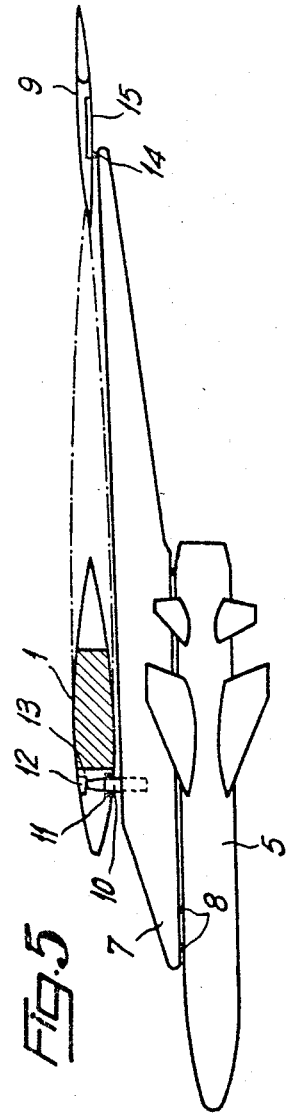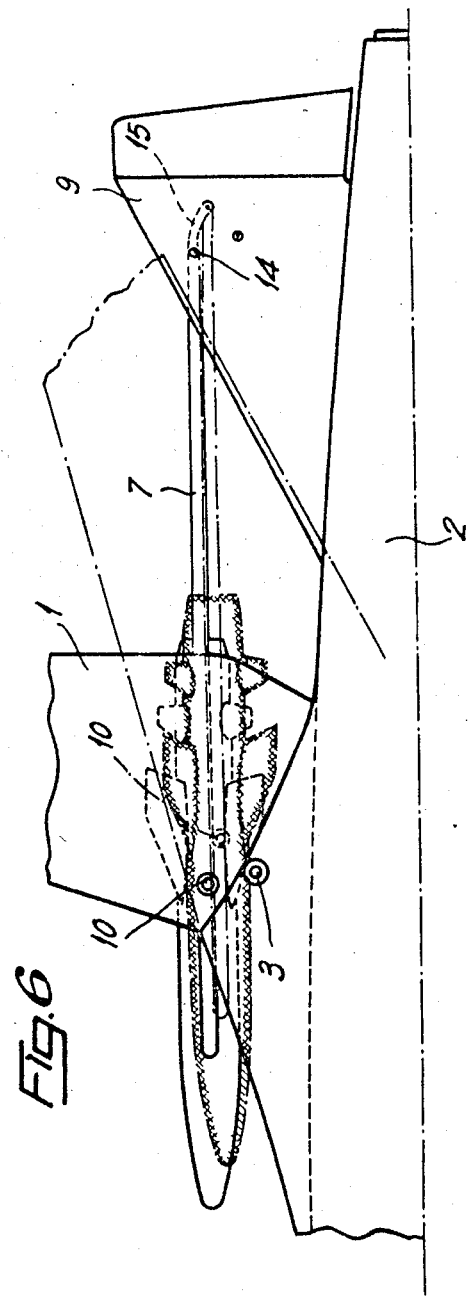

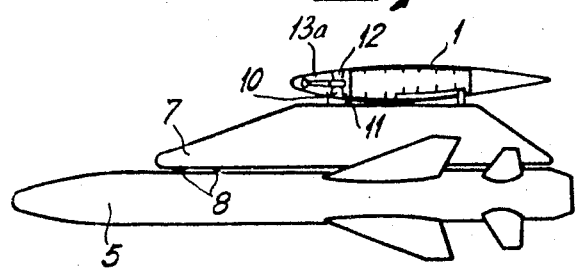
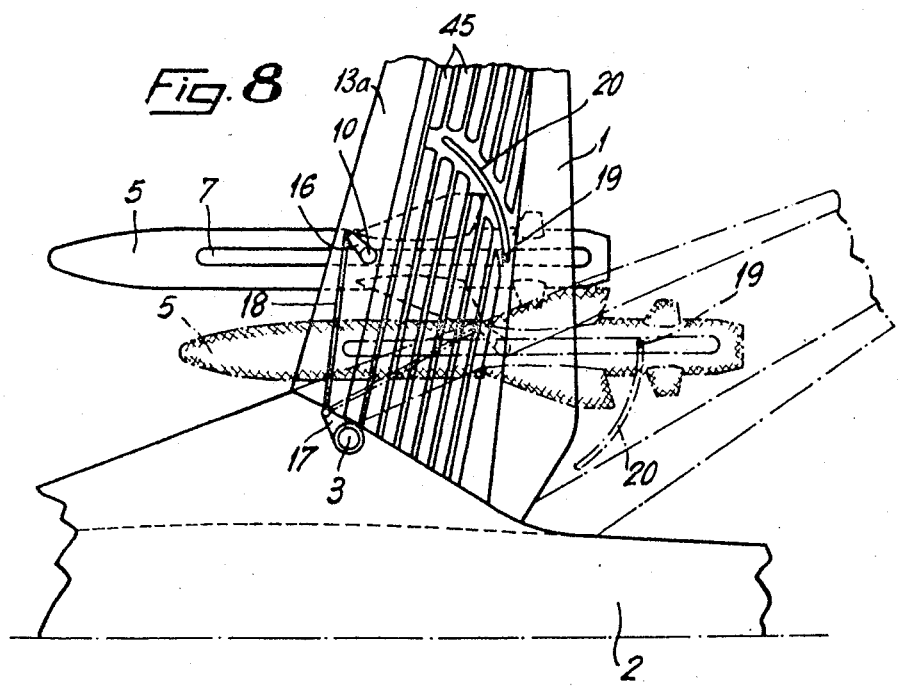

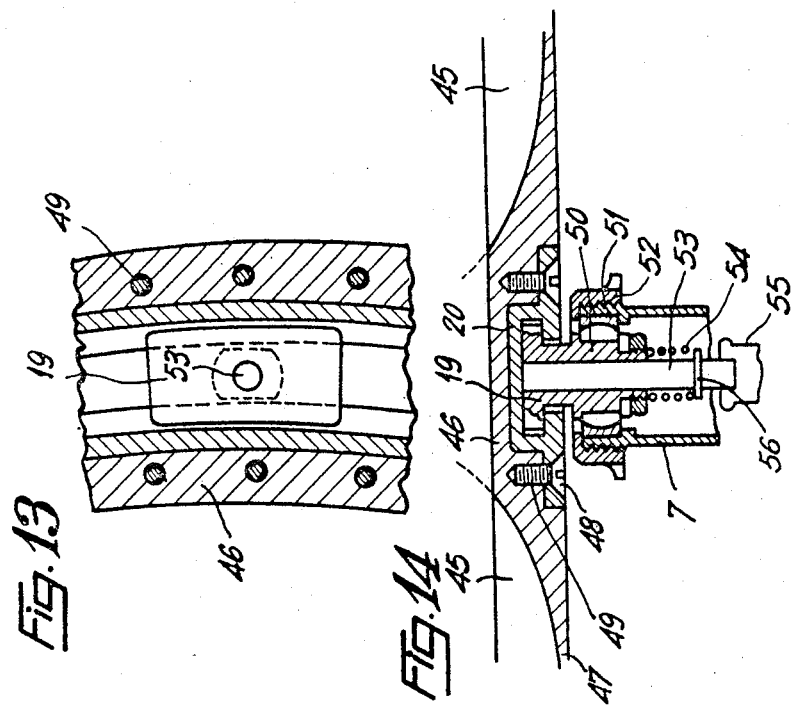
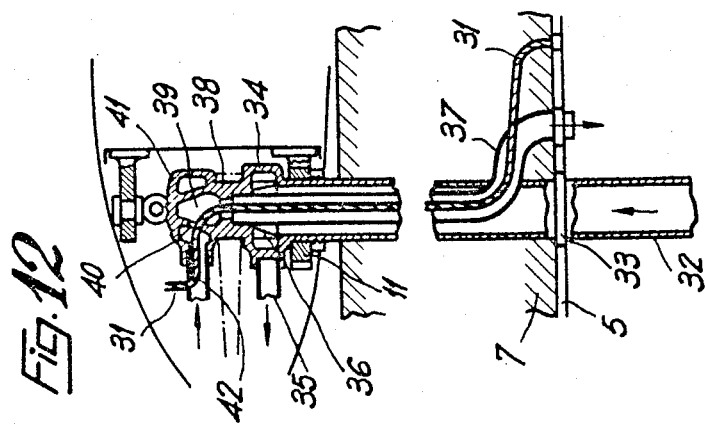

DEVICE FOR ATTACHING EXTERNAL LOAD TO THE WINGS OF AIRCRAFT OF VARIABLE GEOMETRY

This invention relates to aircraft of variable geometry.

The attachment of loads, such as bombs, engines, auxiliary tanks or the like beneath the wings of so-called "variable geometry" aircraft with orientable wings raises difficulties, since the loads must maintain a direction parallel with that of the aircraft, whatever the orientation given to the wings may be.

The present invention enables these difficulties to be obviated by means of an attaching device mainly comprising a load support which is articulated to the wing and connected to a nonorientable part of the aircraft, so that the load support maintains an unchangeable direction in relation thereto.

If the pivoting axes of the wings are far enough away from the fuselage, the load support can be simply attached to the pivot of the corresponding wing, preferably to a nonrotary element of the pivoting mechanism, a further support being provided, for instance, on the tail unit, so as to give the support the necessary immobility.

The load support can also be articulated to the wing parallel with the pivoting axis thereof, and either an external guide or a linkage can be provided which forces the support to remain parallel with itself when wing orientation varies.

The invention will be clearly understood from the following description of an exemplary embodiment thereof, with reference to the accompanying drawings:

FIG. 1 is a diagrammatic partially sectioned elevation of a portion of an aircraft having a load support according to the invention;

FIG. 2 shows the load support differently loaded;

FIG. 3 is a partial plan view, and

FIG. 4 is a partial front elevation corresponding to FIG. 1;

FIG. 5 is a view similar to FIG. 1, but shows a variant in which the load support is articulated to an axis parallel with that of the wing pivot;

FIG. 6 is a partial plan view corresponding to FIG. 5;

FIG. 7 is a partially sectioned elevation of a second variant;

FIG. 8 is a partial plan view corresponding to FIG. 7;

FIG. 12 is a partial sectioned view illustrating the axis of articulation of the load support adapted to accommodate wires of the intercom system, ducts, etc., and FIG. 13 is a partial plan view, and FIG. 14 is a cross section of a guide slide for a load support.

Figure 9:
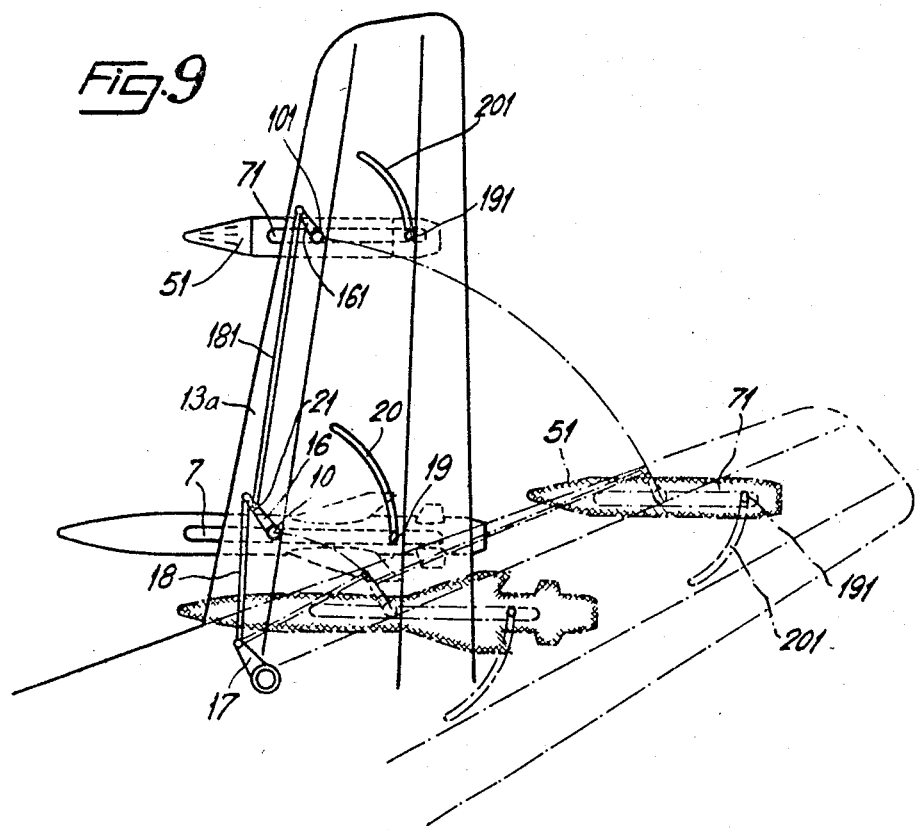
FIG. 9 is a view similar to FIG. 8 but shows an aircraft each wing of which has a number of load supports.

In the embodiment illustrated in FIGS. 1 to 4, wings 1 of a variable geometry aircraft 2 pivot around axes 3 mounted in fixed portions 4 belonging to the aircraft fuselage.

The axes 3 are far enough away from the fuselage to enable loads 5 to be disposed straight below the axes 3.

To this end a load support 7 having hooking devices 8 for loads is attached preferably to a nonrotary member 6 of the pivoting mechanism of each wing.

The support 7 is formed by a thin beam oriented longitudinally of the aircraft and is continued in the rearward direction as far as tail unit 9, to which it can be attached by its end, as shown in FIG. 1.

The attachment at two points distant from one another ensures that the load support will have satisfactory rigidity and moreover, due to its length, the load support can take lengthy loads (FIG. 1) or shorter loads disposed one behind the other, as shown in FIG. 2.

In the variant shown in FIGS. 5 and 6, the load support 7 is basically similar to that in the embodiment illustrated in FIGS. 1 to 4, but it bears a pivot 10 by which it is articulated to the wing 1 at a reduced distance from the pivoting axis 3 of the wing 1. The pivot 10 is mounted in bearings 11, 12 borne by frame 13 of the wing.

To enable the support 7 to remain always parallel with the longitudinal plane of the aircraft, whatever the orientation of the wing 1 may be, the rear end of the support 7 bears a guide finger 14 engaging in a slide 15 disposed below the tail unit 9. The slide describes an arc of a circle equal to and parallel with that described by the pivot 10 during the movements of the wing (FIG. 6).

In the embodiment illustrated in FIGS. 7 and 8 which can be applied inter alia to an aircraft in which the tail unit is disposed in a plane very different from that of the wings, the load support 7 is articulated to the wing 1 by a pivot 10 parallel with the axis 3 and disposed in bearings 11, 12, as in the preceding case, but the means for ensuring that the support remains parallel with the longitudinal direction of the aircraft comprise a linkage formed by an arm 16 keyed to the pivot 10, an arm 17, equal in length to the arm 16 and keyed to a nonrotary member of the pivoting mechanism of the wing 1, and a tie rod 18 whose length is equal to the distance between the pivot 10 and the axis 3. The tie rod 18 therefore forms a parallelogram articulated with the arms 16, 17 and the structure bearing the wing 1.

The rear of the load support bears a guide finger 19 which is forced to follow a circular slide 20 disposed in the underside of the wing and centered on the pivot 10.

In the variant illustrated in FIG. 9, a second load support 71, articulated to a pivot 101 and guided by a finger 191 disposed in a slide 201 in the underside of the wing, is provided for one or more other loads 51.

"As best seen in FIGS. 7, 8, 9 and 10 in front of the medial longitudinal bearing structure 13 there is provided a longitudinal cavity 13a which contains the bearings 11, 12."

To enable these loads also to remain parallel with the longitudinal direction of the aircraft, the pivot 101 bears an arm 161 connected by a tie rod 181 to the arm 16 at a point 21 thereof, so that the tie rod 181 forms an articulated parallelogram with the two arms and the structure of the wing.

Figure 10:
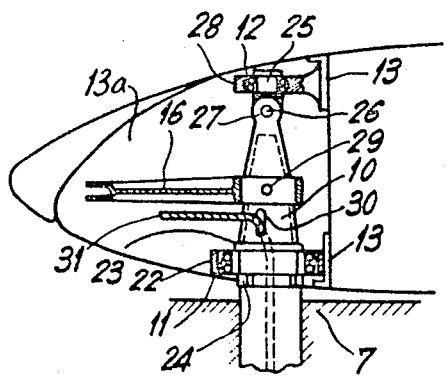
FIGS. 10 and 11 are partially sectioned views to an enlarged scale showing a detail of the articulation of a load support to a wing.
Figure 11:
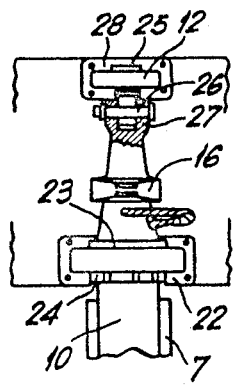

FIGS. 10 and 11 show possible constructions of the pivot 10 or 101.

The pivot is supported at the bottom by an orientable ball or rolling bearing 11 mounted on a support 22 attached to the frame 13 of the wing 1. The inner race of bearing 11 is keyed against a shoulder 23 of pivot 10 and a locking nut 24. At its upper end pivot 10 comprises an end piece 25 hinged on an axis 26 into a fork 27. The endpiece 25 is mounted into an orientable bearing 12 mounted in twin in a support 28 secured to the structure 13 of wing 1.

The arm 16 is keyed to the pivot 10 by a pin 29.

The pivot 10 can be tubular, at least in its lower portion, and formed with a slot 30 through which an accessory, such as an electric cable 31, can extend which is used, for instance, to release or drop the load.

If the load is to be a tank, as shown in FIG. 12, the pivot 10 can be continued by a tube 32 which extends into the reservoir 5 and is connected by a flat union 33 to the pivot 10.

Disposed around the pivot 10, in the wing and above the bearing 11, is a rotary joint 34 enabling a connection to be made to a fuel conduit 35 via slots 36 with which the pivot 10 is formed.

The pivot 10 also contains an air-scavenging conduit 37 which is connected on the one hand to a partition 38 insulating the lower cavity of the pivot 10 from an upper cavity 39 formed with slots 40 and enclosed by a rotary joint 41 connected to a venting pipe 42, the conduit 37 being connected on the other hand to the tank 5 after the conduit 37 has passed in sealingtight relationship through the bottom of the pivot 10.

The electric cable 31 also extends through the conduit 37 and the pipe 42.

Preferably, guide slides 15, 20 and 201 for the load support are so disposed that they do not project below the underside of the wing.

FIGS. 13 and 14 show how a slide, as slide 20, can be constructed for a sealingtight integral-type aircraft covering formed with milled grooves 45 which are also shown in FIG. 8.

The slide 20, which is of T-shaped section, is formed by a profiled member fitted into a rib 46 with which the covering 47 is formed, thus interrupting the grooves 45. The profiled member has flanges via which it is attached to its seating by means of screws 48 received in blind bores 49.

The guide finger 19 comprises a central pin 50 engaging in the slide by a widened head and attached to the load support 7 via a ball-and-socket joint 51 retained in place by a cap nut 52, thus preventing the pin 50 from getting jammed in the slide if the wing is deformed.

Extending through the central pin 50 is a rod 53 which is urged downwardly by a spring 54 and which a jack 55 enables to be repelled in the direction of the slide 20 to lock the load support on the wing, for instance, for firing at targets. At suitable places, inter alia at its ends, the slide can have substantially antifriction pads 56 similar to those from which brake linings are made, and adapted to cooperate with the end of the rod 53.

Clearly, modifications can be made to the embodiments described hereinbefore, inter alia by the substitution of equivalent technical means, without exceeding the scope of the present invention set out in the following claims.

I claim:

1. A device for attaching external loads to the wings of an aircraft with variable geometry provided with wings having a medial longitudinal bearing structure mounted onto a fuselage by means of a stationary pivot and a longitudinal cavity in front of said structure, said device comprising a load support, a pivot secured to said support, means in said longitudinal cavity for mounting said pivot of said support for rotation onto said bearing structure parallel to the pivot of the wing, a pair of arms parallel to each other and having the same length respectively secured to the pivot of the wing and the pivot of the support and a connecting rod for connecting said arms, a second load support, a pivot secured to said support means in said longitudinal cavity for mounting said pivot on said support for rotation onto said bearing structure, parallel to the pivot of the wing, a third arm secured to said pivot of said second support, parallel to the arms of said pair and a connecting rod for connecting said third arm to the arm secured to the pivot of the first load support whereby both load supports are compelled to remain parallel to themselves when the geometry of the aircraft is varied.

2. A device as claimed in claim 1 wherein said load supports are provided with guiding members, guided into guiding slides provided on said bearing structure on the underside of the wing.

3. The device specified in claim 2, wherein means are provided to enable the load support to be locked on the guide slide associated therewith.

4. The device specified in claim 2, wherein a finger mounted on the load support by a free articulation corresponds to each guide slide.

5. A device as claimed in claim 1 wherein said means for mounting said pivot of said load support onto said bearing structure comprise a lower orientable bearing for said pivot and an upper bearing into which a rotatable end piece pivoted to said pivot about an axis perpendicular to the axis of said pivot is mounted.

6. The device specified in claim 5, wherein the axis of articulation of the load support is hollow and accommodates accessories, such as electric cables or pipes.

* * * * *